United States Patent
Yang et al.

(10) Patent No.: US 12,406,343 B1
(45) Date of Patent: Sep. 2, 2025

(54) IMAGE INPAINTING METHOD AND SYSTEM GUIDED BY IMAGE STRUCTURE AND TEXTURE INFORMATION

(71) Applicant: East China Jiaotong University, Nanchang (CN)

(72) Inventors: Gang Yang, Nanchang (CN); Lizhen Dai, Nanchang (CN); Hailong Yang, Nanchang (CN); Jie Sheng, Nanchang (CN); Hui Yang, Nanchang (CN); Rongxiu Lu, Nanchang (CN); Fangping Xu, Nanchang (CN)

(73) Assignee: East China Jiaotong University, Nanchang (CN)

( * ) Notice: Subject to any disclaimer, the term of this patent is extended or adjusted under 35 U.S.C. 154(b) by 0 days.

(21) Appl. No.: 19/027,120

(22) Filed: Jan. 17, 2025

(30) Foreign Application Priority Data

Aug. 30, 2024 (CN) .......................... 202411203742.4

(51) Int. Cl.
  *G06T 5/77* (2024.01)
  *G06N 3/0455* (2023.01)
  (Continued)

(52) U.S. Cl.
  CPC ............ *G06T 5/77* (2024.01); *G06N 3/0455* (2023.01); *G06N 3/0475* (2023.01); *G06T 5/60* (2024.01);
  (Continued)

(58) Field of Classification Search
  CPC .... G06T 5/77; G06T 5/60; G06T 5/00; G06T 2207/20084; G06T 2207/20081;
  (Continued)

(56) References Cited

U.S. PATENT DOCUMENTS

2022/0148241 A1* 5/2022 Park .......................... G06T 5/50

FOREIGN PATENT DOCUMENTS

CN  117196981 A  12/2023

OTHER PUBLICATIONS

Shao, Xinru, et al. "Two-stream coupling network with bidirectional interaction between structure and texture for image inpainting." Expert Systems with Applications 231 (2023): 120700. (Year: 2023).*

(Continued)

*Primary Examiner* — Geoffrey E Summers
(74) *Attorney, Agent, or Firm* — WCF IP

(57) ABSTRACT

Provided is an image inpainting method and system guided by an image structure and texture information. The method includes: constructing an image inpainting model with an interaction ability between the image structure and the texture information; preprocessing a damaged image sample to obtain a mask image sample and an edge structure image sample; inputting the damaged image sample, the mask image sample, and the edge structure image sample into the image inpainting model, training the image inpainting model, and generating weight information of the image inpainting model, to obtain a target image inpainting model; obtaining a damaged image to be restored, preprocessing the damaged image to be restored, to obtain a mask image and an edge structure image, separately inputting the damaged image to be restored, the mask image, and the edge structure image into the target image inpainting model, outputting, by the target image inpainting model, a restored image.

13 Claims, 12 Drawing Sheets

(51) Int. Cl.
   *G06N 3/0475* (2023.01)
   *G06T 5/60* (2024.01)
   *G06T 7/13* (2017.01)

(52) U.S. Cl.
   CPC ...... *G06T 7/13* (2017.01); *G06T 2207/20016* (2013.01); *G06T 2207/20084* (2013.01)

(58) Field of Classification Search
   CPC ............ G06T 7/13; G06T 2207/20016; G06N 3/0455; G06N 3/045; G06N 3/0475; G06N 3/04; G06N 3/047
   See application file for complete search history.

(56) References Cited

OTHER PUBLICATIONS

Yin, Zezhao, et al. "Joint Structure and Texture-guided Image Inpainting with a Multi-Scale Shared Feature Extractor." 2024 5th International Seminar on Artificial Intelligence, Networking and Information Technology (AINIT). IEEE, 2024. (Year: 2024).*

Hao, Qingbo, et al. "MLRN: A multi-view local reconstruction network for single image restoration." Information Processing & Management 61.3 (2024): 103700. (Year: 2024).*

Li, Lan, et al. "Multiscale structure and texture feature fusion for image inpainting." IEEE Access 10 (2022): 82668-82679. (Year: 2022).*

Lian, Jing, et al. "Guiding image inpainting via structure and texture features with dual encoder." The Visual Computer 40.6 (2024): 4303-4317. (Year: 2023).*

CNIPA, Office Action, Application No. 202411203742.4, Sep. 30, 2024.

\* cited by examiner

IMAGE INPAINTING METHOD AND SYSTEM GUIDED BY IMAGE STRUCTURE AND TEXTURE INFORMATION

CROSS REFERENCE TO RELATED APPLICATION

This patent application claims the benefit and priority of Chinese Patent Application No. 2024112037424, filed with the China National Intellectual Property Administration on Aug. 30, 2024, the disclosure of which is incorporated by reference herein in its entirety as part of the present application.

TECHNICAL FIELD

The present disclosure relates to the technical field of image processing, and in particular, to an image inpainting method and system guided by an image structure and texture information.

BACKGROUND

The image inpainting technology is a highly complex and creative computational process. It is not merely about "painting over" damaged areas; rather, it requires in-depth understanding and intelligent analysis of the impaired image. The core of this technology lies in the ability to recognize and simulate patterns and structures within the image, creating pixels that visually blend perfectly with the original material, thereby restoring the image integrity and aesthetic appeal.

Traditional image inpainting methods include manual painting restoration techniques and conventional mathematical algorithms. Manual painting restoration often demands considerable time and specialized skills, while the subjective judgments and personalized styles of restorers can lead to inconsistencies in the inpainting results. Some methods that utilize mathematical algorithms struggle to capture high-level semantic information in images, and these methods may be relatively less robust when faced with noise, distortion, or significant deformation, often resulting in unsatisfactory restoration outcomes.

With the rapid development of artificial intelligence, deep learning-based image inpainting technologies have made significant advancements. In particular, the application of convolutional neural networks (CNNs) in this domain has greatly propelled technological progress. CNNs can learn from a vast array of data samples, capturing deep features of images, which enhances the precision and efficiency of the inpainting process.

In practical applications, this technology can be used to restore faded or damaged historical photographs caused by the passage of time, or to repair images affected by unforeseen events such as floods or fires, aiming to restore the images to original state as closely as possible. Moreover, this technology offers substantial convenience to the digital media industry, such as restoring old films in movie production or correcting flaws in scanned images for digital publishing.

Currently, one of the challenges faced by the image inpainting technology is how to handle extensive or critical area damage. The restoration of these areas not only requires reconstructing the image appearance but also necessitates consideration of the image semantic content and logical structure.

SUMMARY

The present disclosure provides an image inpainting method and system guided by an image structure and texture information, to address the technical issue that a neural network model still produces a distorted structure and blurred texture when tasked with restoring a large damaged area or a complex image, resulting in a significant decline in inpainting quality.

According to a first aspect, the present disclosure provides an image inpainting method guided by an image structure and texture information, including:

constructing an image inpainting model with an interaction ability between the image structure and the texture information, where a structure of the image inpainting model includes a generator and a discriminator, the generator includes a structure and texture interaction module (STIM), a gated interaction unit (GIU), and a multi-view local reconstruction network (MLRN), the STIM includes a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\partial(M_T^n, M_S^n) = -\gamma \lg(1 - X)$$

$$\begin{cases} \text{if } (M_T^n, M_S^n) < \mu, X = \mu \\ \text{else if } (M_T^n, M_S^n) > 1 - \mu, X = 1 - \mu \text{ where} \\ \text{else, } X = (M_T^n, M_S^n) \end{cases}$$

$\theta(\cdot)$ is a mapping function, $(M_T^n, M_S^n)$ is an input eigenvalue, $\lg(\cdot)$ is a logarithmic unction, $\gamma$ is a learnable superparameter, $\mu$ is a set minimal value, $M_T^n$ is a first mask feature segment, $M_S^n$ is a second mask feature segment, and X is a variable;

preprocessing a damaged image sample, to obtain a mask image sample and an edge structure image sample;

inputting the damaged image sample, the mask image sample, and the edge structure image sample into the image inpainting model, training the image inpainting model, and generating weight information of the image inpainting model, to obtain a target image inpainting model; and obtaining a damaged image to be restored, preprocessing the damaged image to be restored, to obtain a mask image and an edge structure image, separately inputting the damaged image to be restored, the mask image, and the edge structure image into the target image inpainting model, and outputting, by the target image inpainting model, a restored image.

According to a second aspect, the present disclosure provides an image inpainting system guided by an image structure and texture information, including:

a construction module configured to construct an image inpainting model with an interaction ability between the image structure and the texture information, where a structure of the image inpainting model includes a generator and a discriminator, the generator includes an STIM, a GIU, and an MLRN, the STIM includes a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\vartheta(M_T^n, M_S^n) = -\gamma \lg(1-X)$$

$$\begin{cases} \text{if } (M_T^n, M_S^n) < \mu, X = \mu \\ \text{else if } (M_T^n, M_S^n) > 1-\mu, X = 1-\mu \text{ where} \\ \text{else, } X = (M_T^n, M_S^n) \end{cases}$$

θ(·) is a mapping function, $(M_T^n, M_S^n)$ is an input eigenvalue, lg(•) is a logarithmic function, γ is a learnable superparameter, μ is a set minimal value, $M_T^n$ is a first mask feature segment, $M_S^n$ is a second mask feature segment, and X is a variable;

a preprocessing module configured to preprocess a damaged image sample, to obtain a mask image sample and an edge structure image sample;

a training module configured to input the damaged image sample, the mask image sample, and the edge structure image sample into the image inpainting model, train the image inpainting model, and generate weight information of the image inpainting model, to obtain a target image inpainting model; and an output module configured to obtain a damaged image to be restored, preprocess the damaged image to be restored, to obtain a mask image and an edge structure image, and separately input the damaged image to be restored, the mask image, and the edge structure image into the target image inpainting model, where the target image inpainting model outputs a restored image.

According to a third aspect, provided is an electronic device, including at least one processor and a memory in communication connection with the at least one processor, where the memory stores an instruction capable of being executed by the at least one processor, and the instruction is executed by the at least one processor, such that the at least one processor executes steps of the image inpainting method guided by an image structure and texture information according to any embodiment of the present disclosure.

According to a fourth aspect, the present disclosure further provides a computer-readable storage medium. The computer-readable storage medium stores a computer program, and when the computer program is executed by a processor, the processor implements steps of the image inpainting method guided by an image structure and texture information according to any embodiment of the present disclosure.

According to the image inpainting method and system guided by an image structure and texture information, an integrated three-encoder network architecture is proposed. Coupling modeling of structure-oriented texture synthesis and texture-guided structure restoration is synchronized under guidance of a damaged image area, to explore the image feature more accurately.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

In order to make the objectives, technical solutions, and advantages of the embodiments of the present disclosure clearer, the technical solutions in the embodiments of the present disclosure will be clearly and completely described below in conjunction with the drawings in the embodiments of the present disclosure. Apparently, the described embodiments are some, rather than all of the embodiments of the present disclosure. All other examples obtained by a person of ordinary skill in the art based on the examples of the present disclosure without creative efforts shall fall within the protection scope of the present disclosure. All other examples obtained by a person of ordinary skill in the art based on the examples of the present disclosure without creative efforts shall fall within the protection scope of the present disclosure.

Figure 1:
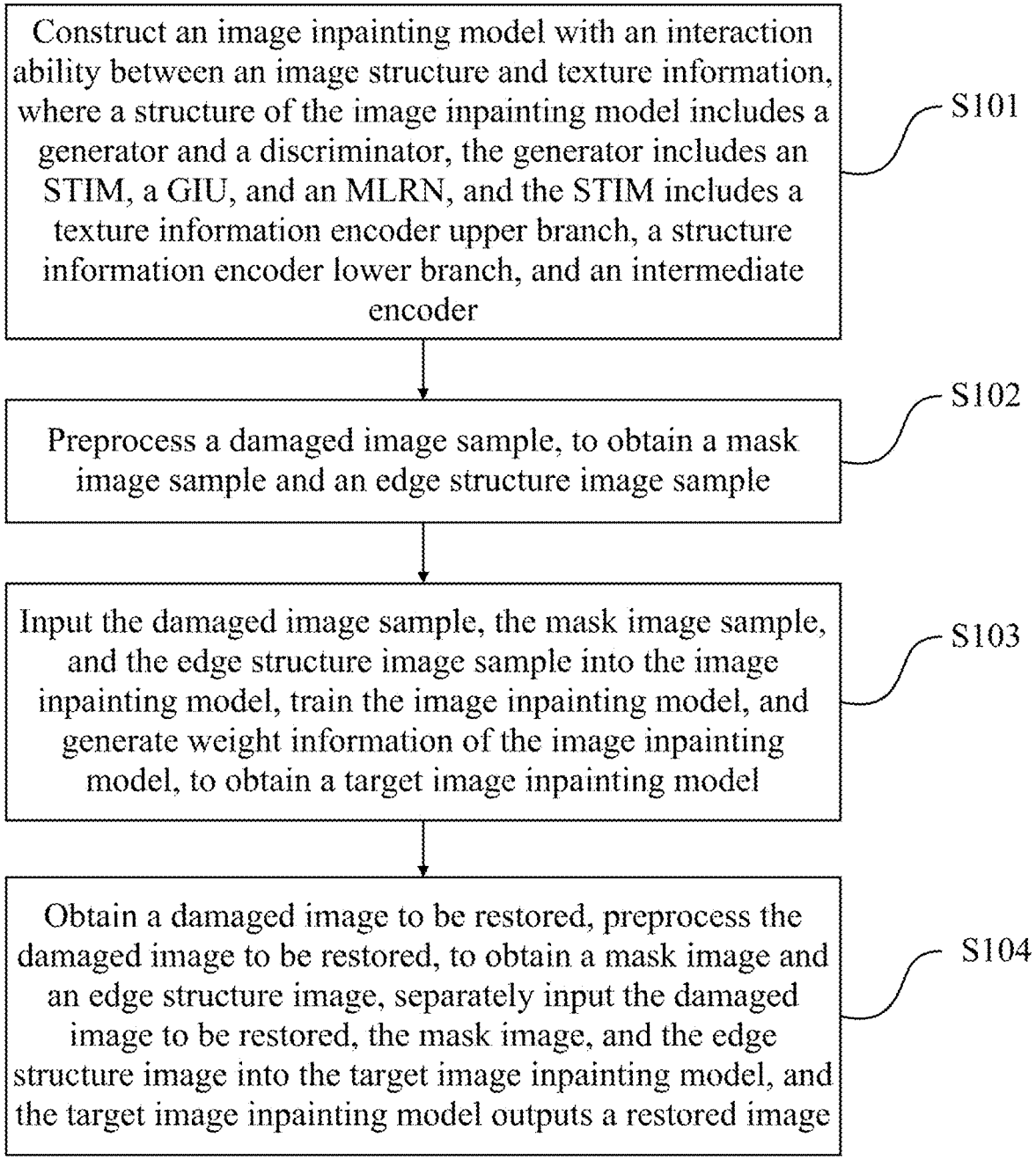
FIG. 1 is a flowchart of an image inpainting method guided by an image structure and texture information according to an embodiment of the present disclosure.

FIG. 1 is a flowchart of an image inpainting method guided by an image structure and texture information according to the present application.

As shown in FIG. 1, the image inpainting method guided by an image structure and texture information specifically includes the following steps:

Step S101: Construct an image inpainting model with an interaction ability between the image structure and the texture information, where a structure of the image inpainting model includes a generator and a discriminator, the generator includes an STIM, a GIU, and an MLRN, and the STIM includes a texture information encoder upper branch, a structure information encoder lower branch, and an intermediate encoder.

In the step, the generator has an encoder-decoder structure similar to an autoencoder (AE), including the STIM, the GIU, and the MLRN sequentially connected in series. The model automatically performs forward propagation, the feature of an input damaged image passes through the STIM, the GIU, and the MLRN in sequence, and the final output is a restored image generated by the image inpainting model.

A loss function of the discriminator in the image inpainting model includes a step loss sub-function, a perceptual loss sub-function, a style loss sub-function, and an adversarial loss sub-function.

An expression of the loss function of the image inpainting model is:

$$L_{joint} = \lambda_1 L_{step} + \lambda_2 L_{perc} + \lambda_3 L_{style} + \lambda_4 L_{adv}.$$

$L_{joint}$ is the loss function of the image inpainting model, $L_{step}$ is the step loss sub-function, $L_{perc}$ is the perceptual loss sub-function, $L_{style}$ is the style loss sub-function, $L_{adv}$ is the adversarial loss sub-function, and $\lambda_1$, $\lambda_2$, $\lambda_3$, and $\lambda_4$ are respectively a weight of the step loss sub-function, a weight of the perceptual loss sub-function, a weight of the style loss sub-function, and a weight of the adversarial loss sub-function.

An expression of the step loss sub-function is:

$$L_{step} = \sum_{k=1}^{5} \eta_k E\left[\left\|I_k^{out} - I_k^{gt}\right\|_1\right].$$

$\eta_k$ is a weighting coefficient, E is an expectation, $I_k^{out}$ is an image output in a $k^{th}$ stage of the MLRN, and $I_k^{gt}$ is an original thumbnail image corresponding to an image size in the $k^{th}$ stage during model training.

An expression of the perceptual loss sub-function is:

$$L_{perc} = E\left[\sum_i \left\|\phi_i(I_1^{out}) - \phi_i(I_1^{gt})\right\|_1\right].$$

$\phi_i$ is activation of an $i^{th}$ pooling layer, $I_1^{out}$ is an image output in a first stage of the MLRN, and $I_1^{gt}$ is an original thumbnail image corresponding to an image size in the first stage during model training.

An expression of the style loss sub-function is:

$$L_{style} = E\left[\sum_i \left\|\psi_i(I_1^{out}) - \psi_i(I_1^{gt})\right\|_1\right].$$

$\psi_i$ is a style loss based on a Gram matrix, and; $\psi_i(\cdot) = \phi_i(\cdot)^T \phi_i(\cdot)$.

An expression of the adversarial loss sub-function is:

$$L_{adv} = \min_G \max_D E_{I_1^{gt}}, E_{E_1^{gt}}\left[\log D(I_1^{gt}, E_1^{gt})\right] + E_{I_1^{out}},$$

$$E_{E_1^{out}} \log[1 - D(I_1^{out}, E_1^{out})].$$

G is the generator, D is the discriminator, $R_1^{gt}$ and $R_1^{out}$ are respectively an edge structure image corresponding to the original thumbnail image corresponding to the image size in the $k^{th}$ stage and an edge structure image corresponding to the image output in the $k^{th}$ stage of the MLRN during model training.

It should be noted that the damaged image sample, the mask image sample, and the edge structure image sample are used as an input into the STIM, and the STIM outputs a feature result, specifically including:

inputting the mask image sample into the intermediate encoder, and outputting, by the intermediate encoder, the first mask feature segment and the second mask feature segment after a convolution operation, a normalization operation and a Sigmoid activation function operation;

jointly inputting a preprocessed image sample combination into the texture information encoder upper branch, outputting, by the texture information encoder upper branch, a texture feature corresponding to the image sample combination, adding the texture feature to a remapped first mask feature segment in a channel dimension after performing a convolution operation, a normalization operation, and a LeakyReLU activation function operation on the texture feature, and then multiplying a result thereof in the channel dimension with a structure feature output by the structure information encoder lower branch, to obtain a first feature result, where the image sample combination includes the damaged image sample, the mask image sample, and the edge structure image sample; and jointly inputting the preprocessed image sample combination into the structure information encoder lower branch, outputting, by the structure information encoder lower branch, the structure feature corresponding to the image sample combination, adding the structure feature to a remapped second mask feature segment in the channel dimension after performing a convolution operation, a normalization operation, and a LeakyReLU activation function operation on the structure feature, and then multiplying a result thereof in the channel dimension with the texture feature output by the texture information encoder upper branch, to obtain a second feature result.

Step S102: Preprocess a damaged image sample, to obtain a mask image sample and an edge structure image sample.

In the step, the damaged image sample is input into a Canny edge detector, and the Canny edge detector outputs the edge structure image sample corresponding to the damaged image sample.

Step S103: Input the damaged image sample, the mask image sample, and the edge structure image sample into the image inpainting model, train the image inpainting model, and generate weight information of the image inpainting model, to obtain a target image inpainting model.

In the step, the encoder of the generator has three layers, mainly composed of three branches. In the encoder, the job of the STIM is to send the preprocessed damaged image sample and structure image sample to the texture information encoder upper branch and the structure information encoder lower branch, for extracting the image features independently, and the 0-1 mask of the damaged area information of the image is sent to the intermediate encoder for guiding feature extraction.

A bottleneck layer of the generator is mainly composed of four layers of GIUs, which can focus on extracting effective features. In the bottleneck layer, feature information from the encoder of the STIM is input into the GIU for residual convolution. The residual branch additionally calculates attention scores for the feature in the spatial dimension and channel dimension, weighs the scores into the backbone network of the forward channel to extract useful information and filter out irrelevant information.

The decoder of the generator is mainly composed of a five-level stepped MLRN, which gradually restores a low-resolution image to a high-resolution image. The MLRN works by taking feature information from the GIU in the bottleneck layer and sequentially performing convolution and deconvolution, to first restore a low-resolution image with a smaller feature size, gradually to restore a medium-resolution image, and finally to restore a full-size image.

It should be noted that the texture information encoder upper branch and the structure information encoder lower branch of the STIM each perform a gated convolution operation, an instance normalization operation, and a LeakyReLU activation function operation. The intermediate encoder branch can be subdivided into two stages. The first stage is mask update, which includes a conventional convolution operation, an instance normalization operation, and Sigmoid activation function operation. The second stage is two-way information interaction between the structure feature and the texture feature guided by the mask. The feature output in the first stage is used as an input of the second stage, and the input feature is divided into the first mask feature segment and the second mask feature segment according to the channel dimension, which are sent to a texture interactor and a structure interactor respectively. A small-range logarithmic function is introduced as a mapping function of the texture interactor and the structure interactor to remap the input feature, which is expressed as:

$$\vartheta(M_T^n, M_S^n) = -\gamma \lg(1 - X)$$
$$\begin{cases} \text{if } (M_T^n, M_S^n) < \mu, X = \mu \\ \text{else if } (M_T^n, M_S^n) > 1 - \mu, X = 1 - \mu \\ \text{else, } X = (M_T^n, M_S^n) \end{cases}$$

$\theta(\cdot)$ is a mapping function, $(M_T^n, M_S^n)$ is an input eigenvalue, $\lg(\cdot)$ is a logarithmic function, $\gamma$ is a learnable superparameter, $\mu$ is a set minimal value, $M_T^n$ is the first mask feature segment, $M_S^n$ is the second mask feature segment, and X is a variable;

In the texture interactor, the structure feature is used to guide texture feature extraction. A convolution operation, an instance normalization operation, and a LeakyReLU activation function operation are performed on the texture feature output by the texture information encoder upper branch, then the texture feature is added to a remapped first mask feature segment in the channel dimension, and then a result thereof is multiplied in the channel dimension with a structure feature output by the structure information encoder lower branch, with a result used as the output of the texture interactor.

In the structure interactor, the texture feature is used to guide structure feature extraction. A convolution operation, a normalization operation, and a LeakyReLU activation function operation are performed on the structure feature output by the structure information encoder lower branch, then the structure feature is added to a remapped second mask feature segment in the channel dimension, and then a result thereof is multiplied in the channel dimension with the texture feature output by the texture information encoder upper branch, with a result used as the output of the structure interactor.

The GIU includes a forward connection and a residual connection, and the forward connection includes a convolution operation, an instance normalization operation, and a LeakyReLU activation function. In the residual connection, the feature is subjected to a strip pooling operation in a feature height direction and a strip pooling operation in a feature width direction, channel expansion is performed through 3×1 convolution, and then features are concatenated in the channel dimension to restore original height and width of the feature input into the GIU. Then the 3×1 convolution using a Sigmoid activation function is applied to generate an image gated feature, which is added to the forward connection in the channel dimension. The result is used as a final output of the GIU.

The five steps of the MLRN sequentially restore 1/16, 1/8, 1/4, 1/2 and 1/1 of the original image resolution. A feature result of each step has two forward outputs: a pixel-wise restoration output that uses 1×1 mapping convolution to restore an image of a corresponding size, and a feature transfer output that transfers a low-resolution feature to a high-resolution feature to guide high-resolution restoration.

Furthermore, the structure-texture double-branch discriminator has two feature transfer branches, the texture branch and the structure branch each have five symmetric convolution layers, and each convolution layer includes a conventional convolution operation and a Sigmoid activation function. The structure branch has an additional residual block detection at the input end, which is used to map the feature to the contour edge of the image structure. Eigenvalues output by the two branches are transformed into a range of 0 to 1 using the Sigmoid nonlinear activation function, thereby calculating the adversarial network loss.

Step S104: Obtain a damaged image to be restored, preprocess the damaged image to be restored, to obtain a mask image and an edge structure image, separately input the damaged image to be restored, the mask image, and the edge structure image into the target image inpainting model, and the target image inpainting model outputs a restored image.

To sum up, in existing methods, incorrect structure and texture information affects each other and transfers, resulting in significant distortion and deterioration of image restoration results. The present disclosure designs an image inpainting method guided by an image structure and texture information and proposes an integrated three-encoder network architecture. Guided by the damaged area of the image, coupling modeling of structure-oriented texture synthesis and texture-guided structure restoration is synchronized, to explore the image feature more accurately. Emphasis is placed on enhancing key area features, which effectively improves the quality of restoration. A layer-by-layer restoration strategy is adopted to gradually restore structure and texture information from low to high resolution. This method ensures high visual consistency between the damaged and undamaged parts of the image, making the restored image appear more natural and realistic.

Figure 2:
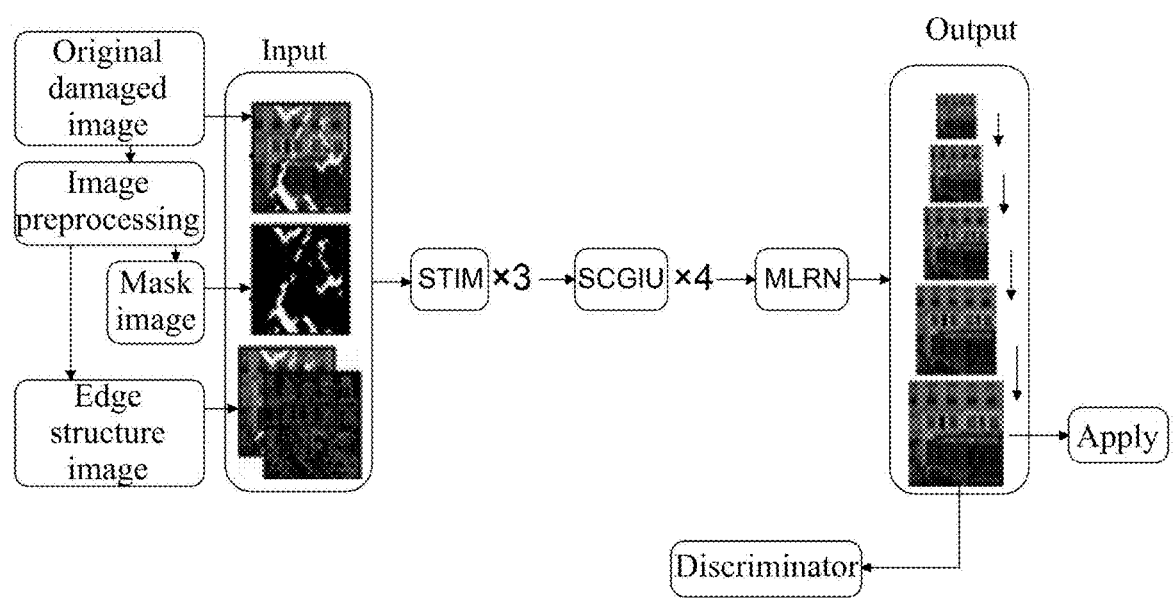
FIG. 2 is a principle block diagram of image inpainting guided by an image structure and texture information according to a specific embodiment of the present disclosure.

In a specific embodiment, as shown in FIG. 2, the principle for image inpainting guided by an image structure and texture information includes:

Step S1: Preprocess a damaged image to be input into an image inpainting model, where an edge structure diagram of the damaged image is generated by a Canny edge detector.

In this embodiment, images from three public datasets: CelebA, Paris Street View, and Places2, are used. Irregular masks are applied to replace the damaged parts of the images, resulting in a total of 12,000 masked images. The masks are divided into three groups according to the proportion of coverage of the whole image: 0%-20%, 20%-40%, and 40%-60%. For the CelebA dataset, this embodiment divides 30,000 original images into 29,900 for training and 100 for testing. For the Places2 dataset, this embodiment uses 1.8 million images from 365 scene categories in the original training set for training, and randomly selects 200 images from the original test set for testing. For the Paris Street View dataset, this embodiment uses 14,900 pre-divided training images and 100 pre-divided test images.

Step S2: Input the damaged image, the mask image, and the corresponding edge structure image into the generator of the image inpainting model. The input image combination first passes through the three-layer STIM of the model. The job of each layer of the STIM is to send the preprocessed damaged image and structure image to the texture information encoder upper branch and the structure information encoder lower branch, for extracting the image feature independently, and the 0-1 mask of the damaged area information of the image is sent to the intermediate encoder for guiding feature extraction.

Figure 3:
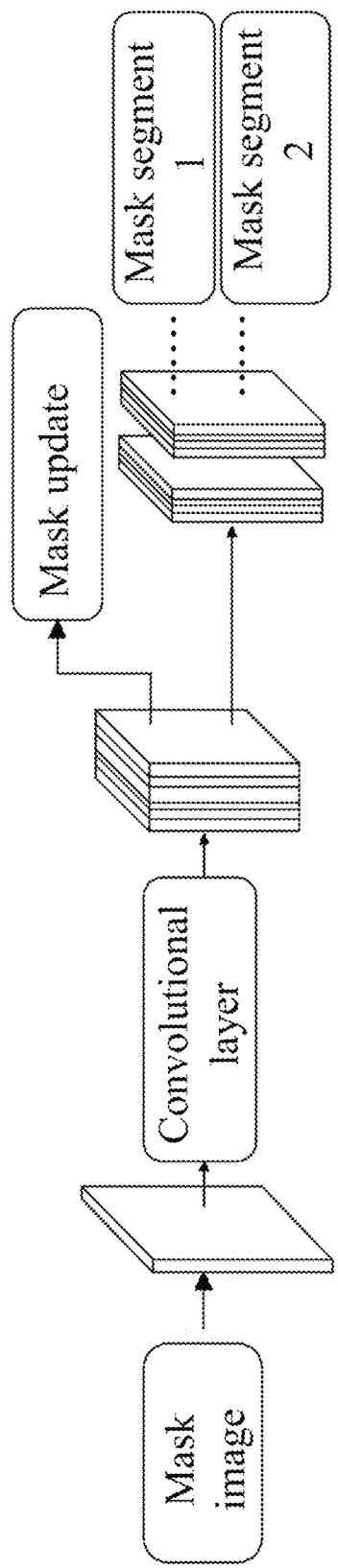
FIG. 3 is a schematic diagram of a working process of an STIM in a first stage according to a specific embodiment of the present disclosure.
Figure 4:
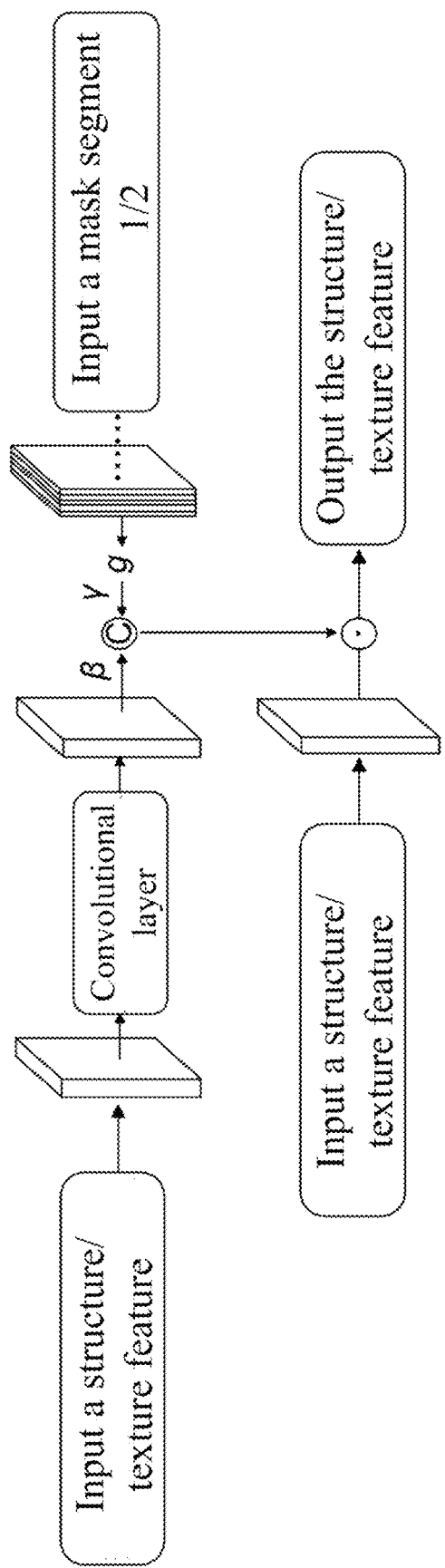
FIG. 4 is a schematic diagram of a working process of an STIM in a second stage according to a specific embodiment of the present disclosure.

The workflow of the STIM is shown in FIG. 3 and FIG. 4. The convolution operation, the normalization operation, and the activation function operation are combined into one convolution layer in FIG. 3 and FIG. 4.

The texture information encoder upper branch and the structure information encoder lower branch of the STIM each perform a gated convolution operation, an instance normalization operation, and a LeakyReLU activation function operation. The intermediate encoder branch can be subdivided into two stages. The first stage is mask update, which includes a conventional convolution operation, an instance normalization operation, and Sigmoid activation function operation, as shown in FIG. 3. The second stage is two-way information interaction between the structure feature and the texture feature guided by the mask. As shown in FIG. 4, the feature output in the first stage is used as an input of the second stage, and the input feature is divided into the first mask feature segment and the second mask feature segment according to the channel dimension, which are sent to a texture interactor and a structure interactor respectively. A small-range logarithmic function is introduced as a mapping function of the texture interactor and the structure interactor to remap the input feature.

In the texture interactor, the structure feature is used to guide texture feature extraction. A convolution operation, an instance normalization operation, and a LeakyReLU activation function operation are performed on the texture feature output by the texture information encoder upper branch, then the texture feature is added to a remapped first mask feature segment in the channel dimension, and then a result thereof is multiplied in the channel dimension with a structure feature output by the structure information encoder lower branch, with a result used as the output of the texture interactor.

In the structure interactor, the texture feature is used to guide structure feature extraction. A convolution operation, a normalization operation, and a LeakyReLU activation function operation are performed on the structure feature output by the structure information encoder lower branch, then the structure feature is added to a remapped second mask feature segment in the channel dimension, and then a result thereof is multiplied in the channel dimension with the texture feature output by the texture information encoder upper branch, with a result used as the output of the structure interactor.

Step S3: The final output of the STIM is used as input of the four-layer GIU. Feature information from the encoder of the STIM is input into the GIU for residual convolution. The residual branch additionally calculates attention scores for the feature in the spatial dimension and channel dimension, weighs the scores into the backbone network of the forward channel to extract useful information and filter out irrelevant information.

Figure 5:
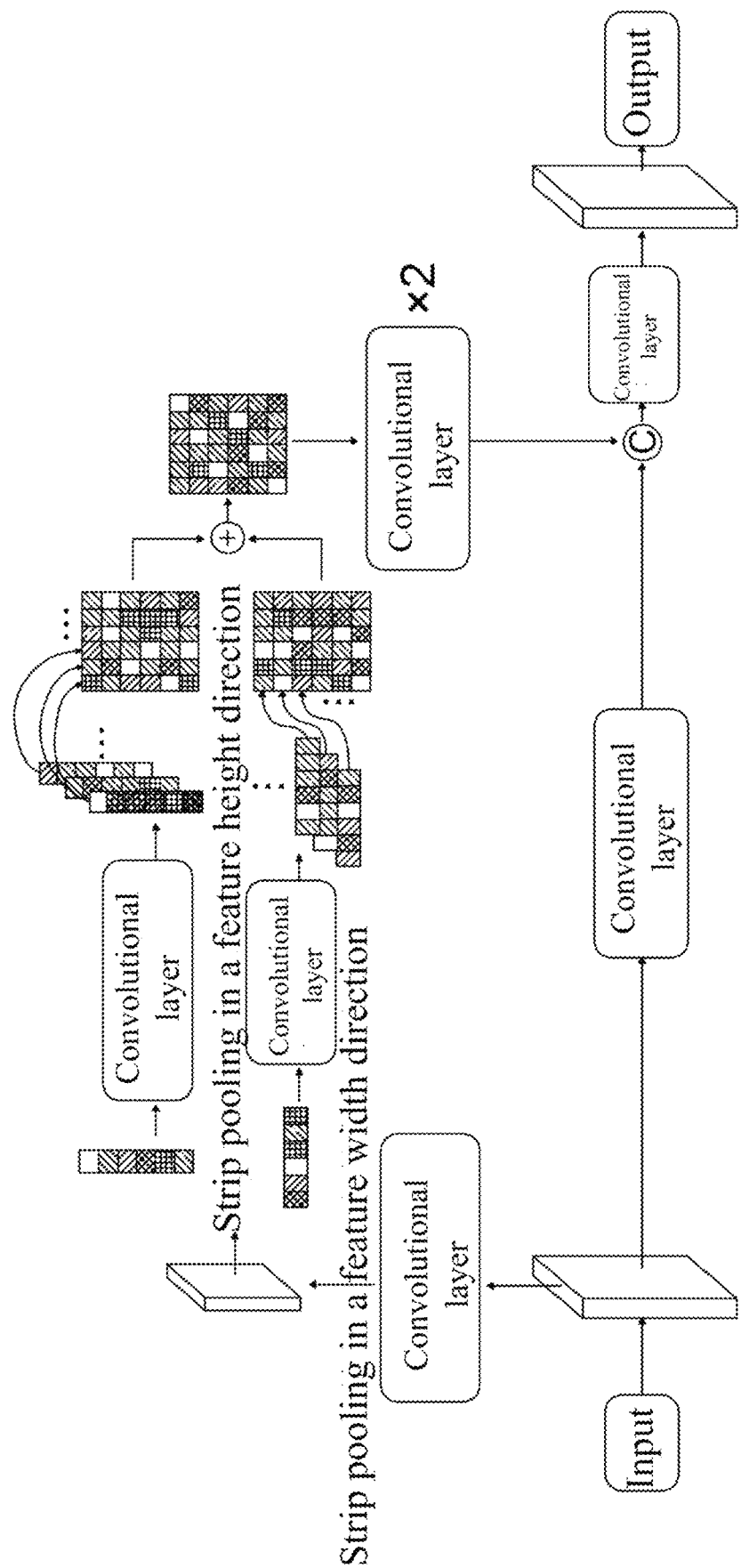
FIG. 5 is a schematic diagram of a working process of a GIU according to a specific embodiment of the present disclosure.

The workflow of the GIU is shown in FIG. 5. The convolution operation, the normalization operation, and the activation function operation are combined into one convolution layer in the figure.

The GIU includes a forward connection and a residual connection, and the forward connection includes a convolution operation, an instance normalization operation, and a LeakyReLU activation function. In the residual connection, the feature is subjected to a strip pooling operation in a feature height direction and a strip pooling operation in a feature width direction, channel expansion is performed through 3×1 convolution, and then features are concatenated in the channel dimension to restore original height and width of the feature input into the GIU. Then the 3×1 convolution using a Sigmoid activation function is applied to generate an image gated feature, which is added to the forward connection in the channel dimension. The result is used as a final output of the GIU.

Step S4: The final output of the GIU is used as the input of the five-level stepped MLRN restoration network. The MLRN works by taking feature information from the GIU in the bottleneck layer and sequentially performing convolution and deconvolution, to first restore a low-resolution image with a smaller feature size, gradually to restore a medium-resolution image, and finally to restore a full-size image.

Figure 6:
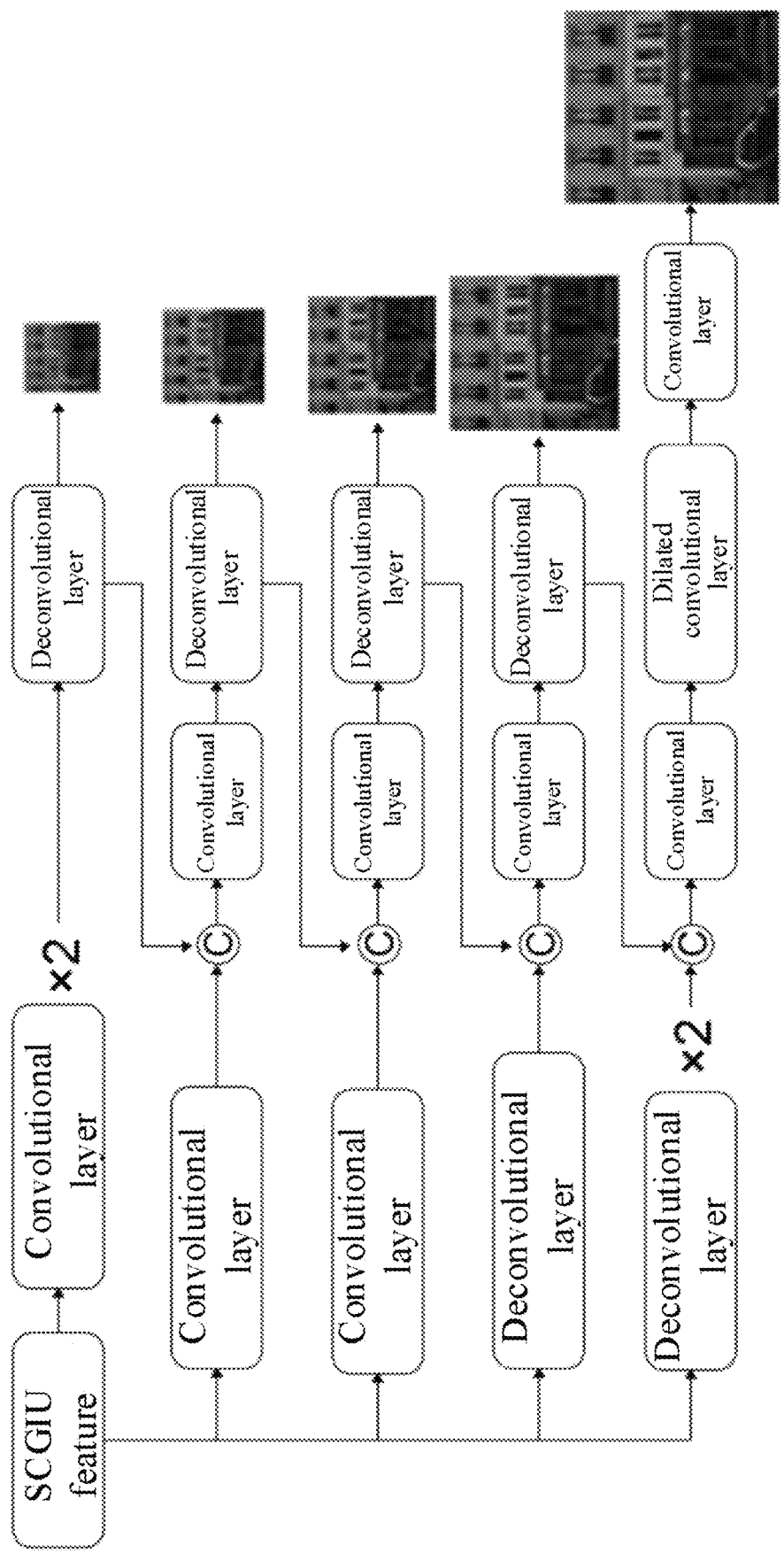
FIG. 6 is a schematic diagram of a working process of an MLRN according to a specific embodiment of the present disclosure.
Figure 7A:
FIG. 7 is a diagram of practical effects of applying an image inpainting method guided by an image structure and texture information to old photo restoration, object removal, and style conversion according to a specific embodiment of the present disclosure.
Figure 7B:
Figure 7C:
Figure 7D:
Figure 7E:
Figure 7F:
Figure 7G:
Figure 7H:
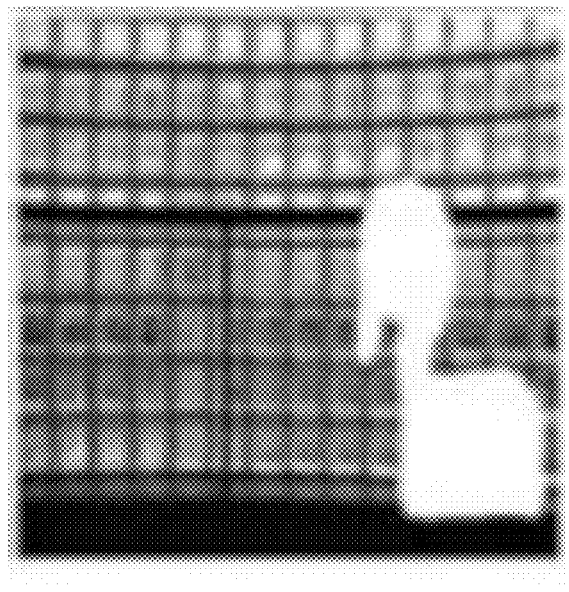
Figure 7I:
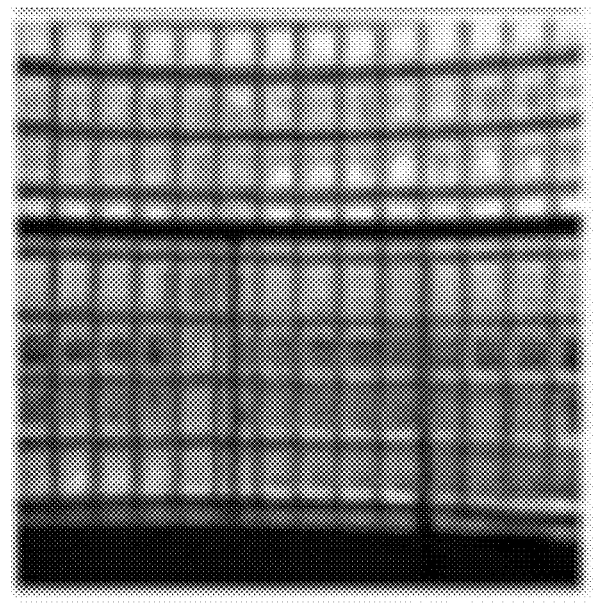

The workflow of the MLRN is shown in FIG. 6. The convolution operation, the normalization operation, and the activation function operation are combined into one convolution layer in FIG. 6.

The five steps of the MLRN sequentially restore 1/16, 1/8, 1/4, 1/2 and 1/1 of the original image resolution. A feature result of each step has two forward outputs: a pixel-wise restoration output that uses 1×1 mapping convolution to restore an image of a corresponding size, and a feature transfer output that transfers a low-resolution feature to a high-resolution feature to guide high-resolution restoration. The generated image with the original image resolution is used as the final output for training or application.

Step S5: Input the image finally generated in the step S4 into the discriminator for discriminating training. The structure-texture double-branch discriminator has two feature transfer branches, the texture branch and the structure branch each have five symmetric convolution layers, and each convolution layer includes a conventional convolution operation and a Sigmoid activation function. The structure branch has an additional residual block detection at the input end, which is used to map the feature to the contour edge of the image structure. Eigenvalues output by the two branches are transformed into a range of 0 to 1 using the Sigmoid nonlinear activation function.

Step S6: Repeat step S1 to step S5 to train the image inpainting model and generate a weight file corresponding to the model for image inpainting.

Step S7: Load the trained weight file of the model, repeat step S1 to step S4, and output the restored image.

FIG. 7 is a diagram of actual restoration effects for damaged photos according to the present disclosure, including application scenarios such as old image crease restoration, image occlusion removal, and image style conversion.

The simulation experiment for this application is conducted using PYTORCH, with the NVIDIA® Tesla® V100 GPU utilized for training and testing. For comparison, all masks of the images and damage areas are resized to 256×256 pixels, the batch size is set to 6, and the Adam optimizer is employed. The initial learning rate is 0.0002, while the fine-tuning learning rate is 0.00005, and all normalization layers in the generator are frozen simultaneously.

The superior performance of this method is validated against five representative image inpainting algorithms: EC, LBAM, MED, RFR, and CTSDG. For image quality evaluation, several common metrics in image inpainting tasks are used, including peak signal-to-noise ratio (PSNR), structural similarity index (SSIM), and learned perceptual image patch similarity (LPIPS). The experimental results on the Paris dataset are shown in Table 1.

TABLE 1

Comparison of experimental results on the Paris dataset

| PSNR (The greater, the better) | | | |
| --- | --- | --- | --- |
| Masking rate | 0%-20% | 20%-40% | 40%-60% |
| EC | 34.02 | 27.07 | 23.06 |
| LBAM | 34.69 | 27.00 | 22.98 |
| MED | 34.23 | 26.63 | 22.30 |
| RFR | 34.96 | 27.56 | 23.57 |
| CTSDG | 35.14 | 27.51 | 23.45 |
| Present disclosure | 36.07 | 28.33 | 23.99 |
| SSIM (The greater, the better) | | | |
| Masking rate | 0%-20% | 20%-40% | 40%-60% |
| EC | 0.962 | 0.870 | 0.748 |
| LBAM | 0.964 | 0.867 | 0.736 |
| MED | 0.963 | 0.865 | 0.728 |
| RFR | 0.965 | 0.877 | 0.758 |
| CTSDG | 0.967 | 0.877 | 0.753 |
| Present disclosure | 0.971 | 0.891 | 0.776 |
| LPIPS (The smaller, the better) | | | |
| Masking rate | 0%-20% | 20%-40% | 40%-60% |
| EC | 0.036 | 0.110 | 0.203 |
| LBAM | 0.033 | 0.113 | 0.211 |
| MED | 0.229 | 0.037 | 0.122 |
| RFR | 0.034 | 0.103 | 0.188 |
| CTSDG | 0.217 | 0.033 | 0.113 |
| Present disclosure | 0.026 | 0.092 | 0.185 |

It can be seen from the results of the image inpainting metrics presented in Table 1 that the method of the present application outperforms the comparison methods in damaged image inpainting. The error between the pixel values of the experimental images obtained and the actual images is the smallest among all experimental methods, indicating that the image inpainting effect is the best.

Figure 8:
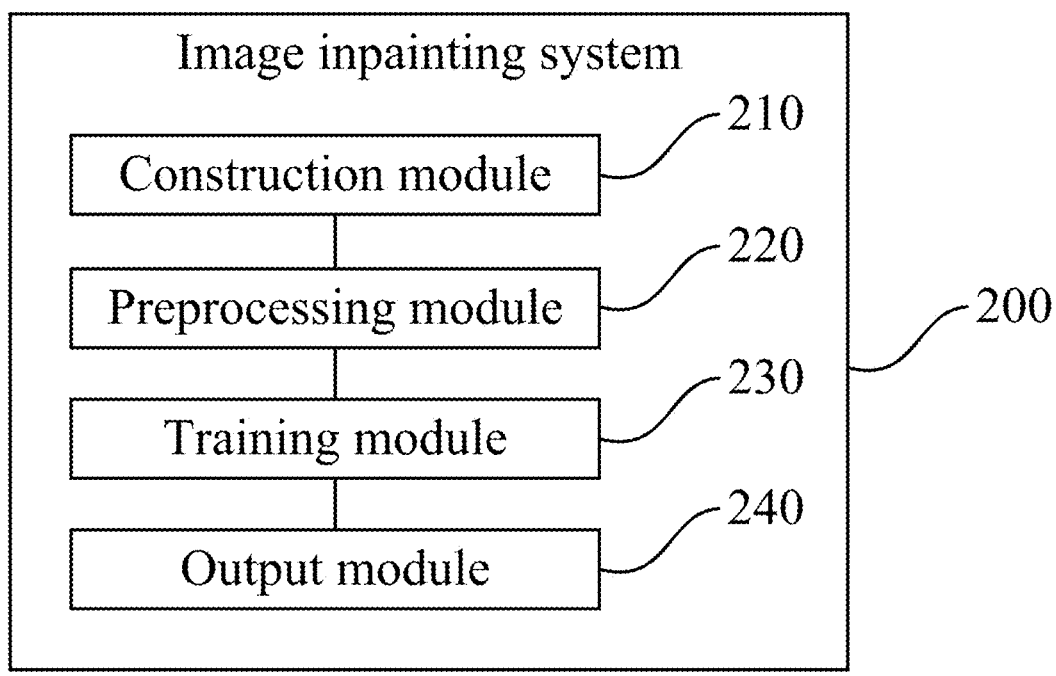
FIG. 8 is a structural block diagram of an image inpainting system guided by an image structure and texture information according to an embodiment of the present disclosure.

FIG. 8 is a structural block diagram of an image inpainting system guided by an image structure and texture information according to the present application.

As shown in FIG. 8, the image inpainting system 200 includes a construction module 210, a preprocessing module 220, a training module 230, and an output module 240.

The construction module 210 is configured to construct an image inpainting model with an interaction ability between the image structure and the texture information, where a structure of the image inpainting model includes a generator and a discriminator, the generator includes a STIM, a GIU, and a MLRN, the STIM includes a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\partial(M_T^n, M_s^n) = -\gamma\lg(1 - X)$$

$$\begin{cases} \text{if } (M_T^n, M_S^n) < \mu, X = \mu \\ \text{else if } (M_T^n, M_S^n) > 1 - \mu, X = 1 - \mu \\ \text{else}, X = (M_T^n, M_S^n) \end{cases}$$

θ(·) is a mapping function, $(M_T^n, M_S^n)$ is an input eigenvalue, lg(•) is a logarithmic function, γ is a learnable superparameter, μ is a set minimal value, $M_T^n$ is a first mask feature segment, $M_S^n$ is a second mask feature segment, and X is a variable.

The preprocessing module 220 is configured to preprocess a damaged image sample, to obtain a mask image sample and an edge structure image sample.

The training module 230 is configured to input the damaged image sample, the mask image sample, and the edge structure image sample into the image inpainting model, train the image inpainting model, and generate weight information of the image inpainting model, to obtain a target image inpainting model.

The output module 240 is configured to obtain a damaged image to be restored, preprocess the damaged image to be restored, to obtain a mask image and an edge structure image, separately input the damaged image to be restored, the mask image, and the edge structure image into the target image inpainting model, where the target image inpainting model outputs a restored image.

It should be understood that the modules in FIG. 8 correspond to the steps in the method described with reference to FIG. 1. Therefore, the operations and features described above for the method and the corresponding technical effects are also applicable to the modules in FIG. 8, and details are not be repeated herein.

In some other embodiments, the present disclosure further provides a computer-readable storage medium. The computer-readable storage medium stores a computer program, and when computer instruction is executed by a processor, the processor implements steps of the image inpainting method guided by an image structure and texture information according to any method embodiment.

In an implementation, the computer-readable storage medium stores computer-executable instructions used for executing the following steps:

constructing an image inpainting model with an interaction ability between the image structure and the texture information, where a structure of the image inpainting model includes a generator and a discriminator, the generator includes an STIM, a GIU, and an MLRN, the STIM includes a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\vartheta(M_T^n, M_s^n) = -\gamma \lg(1 - X)$$

$$\begin{cases} \text{if } (M_T^n, M_S^n) < \mu, X = \mu \\ \text{else if } (M_T^n, M_S^n) > 1 - \mu, X = 1 - \mu \\ \text{else}, X = (M_T^n, M_S^n) \end{cases}$$

where $\theta(\cdot)$ is a mapping function, $(M_T^n, M_S^n)$ is an input eigenvalue, $\lg(\bullet)$ is a logarithmic function, $\gamma$ is a learnable superparameter, $\mu$ is a set minimal value, $M_T^n$ is a first mask feature segment, $M_S^n$ is a second mask feature segment, and X is a variable;

preprocessing a damaged image sample, to obtain a mask image sample and an edge structure image sample;

inputting the damaged image sample, the mask image sample, and the edge structure image sample into the image inpainting model, training the image inpainting model, and generating weight information of the image inpainting model, to obtain a target image inpainting model; and obtaining a damaged image to be restored, preprocessing the damaged image to be restored, to obtain a mask image and an edge structure image, separately inputting the damaged image to be restored, the mask image, and the edge structure image into the target image inpainting model, and outputting, by the target image inpainting model, a restored image.

The computer-readable storage medium may mainly include a program storage area and a data storage area. The program storage area may store an operating system, and an application required by at least one function; and the data storage area may store data that is created based on use of the image inpainting system guided by an image structure and texture information. In addition, the computer-readable storage medium may include a high-speed random access memory, and may further include a nonvolatile memory, for example, at least one magnetic disk storage device, a flash storage device, or another nonvolatile solid-state storage device. In some embodiments, the computer-readable storage medium may optionally include memories remotely configured relative to the processor, and these remote memories may be connected through a network to the image inpainting system guided by an image structure and texture information. Examples of the foregoing network include, but are not limited to, the Internet, an enterprise intranet, a local area network, a mobile communication network, and a combination thereof.

Figure 9:
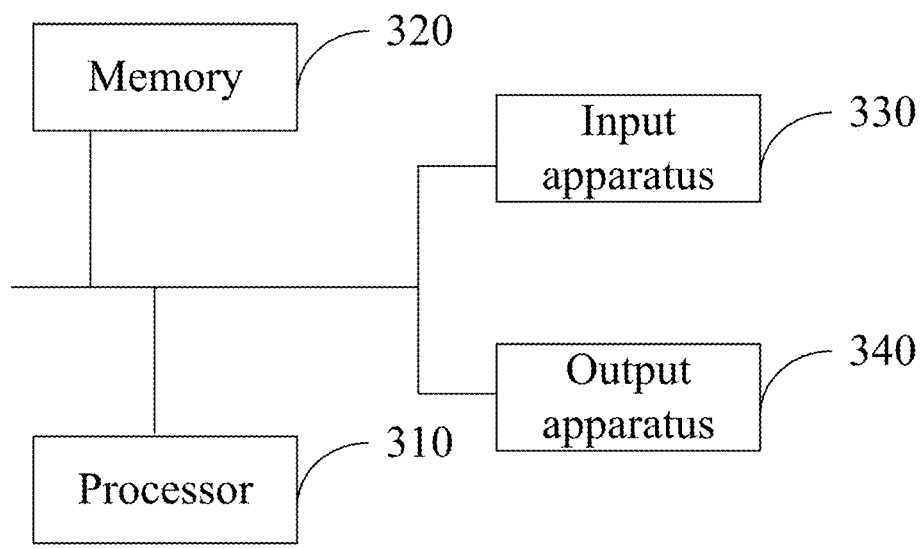
FIG. 9 is a schematic structural diagram of an electronic device according to an embodiment of the present disclosure.

FIG. 9 is a schematic structural diagram of an electronic device according to an embodiment of the present disclosure. As shown in FIG. 9, the device includes a processor 310 and a memory 320. The electronic device may further include an input apparatus 330 and an output apparatus 340. The processor 310, the memory 320, the input apparatus 330, and the output apparatus 340 may be connected through a bus or another means, and the connection through a bus is taken as an example in FIG. 9. The memory 320 is the computer-readable storage medium above. The processor 310 runs the non-volatile software program, instruction, and module stored in the memory 320 to execute various functional applications and data processing of a server, namely, to implement the image inpainting method guided by an image structure and texture information. The input apparatus 330 may be configured to receive entered numbers or character information, and generate key signal input related to user setting and function control of the image inpainting system guided by an image structure and texture information. The output apparatus 340 may include a display device such as a display screen.

The electronic device can execute the method provided in the embodiments of the present disclosure, and has corresponding functional modules for executing the method and beneficial effects. For technical details not described in detail in this embodiment, reference may be made to the method provided in the embodiments of the present disclosure.

In an implementation, the electronic device is used in a client and applied to the image inpainting system guided by an image structure and texture information. The electronic device includes at least one processor and a memory in communication connection with the at least one processor. The memory stores an instruction capable of being executed by the at least one processor, and the instruction is executed by the at least one processor, such that the at least one processor executes the following steps:

constructing an image inpainting model with an interaction ability between the image structure and the texture information, where a structure of the image inpainting model includes a generator and a discriminator, the generator includes an STIM, a GIU, and an MLRN, the STIM includes a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\vartheta(M_T^n, M_s^n) = -\gamma \lg(1 - X)$$

$$\begin{cases} \text{if } (M_T^n, M_S^n) < \mu, X = \mu \\ \text{else if } (M_T^n, M_S^n) > 1 - \mu, X = 1 - \mu \quad \text{where} \\ \text{else}, X = (M_T^n, M_S^n) \end{cases}$$

$\theta(\cdot)$ is a mapping function, $(M_T^n, M_S^n)$ is an input eigenvalue, $\lg(\bullet)$ is a logarithmic function, $\gamma$ is a learnable superparameter, $\mu$ is a set minimal value, $M_S^n$ is a first mask feature segment, $M_S^n$ is a second mask feature segment, and X is a variable;

preprocessing a damaged image sample, to obtain a mask image sample and an edge structure image sample;

inputting the damaged image sample, the mask image sample, and the edge structure image sample into the image inpainting model, training the image inpainting model, and generating weight information of the image inpainting model, to obtain a target image inpainting model; and obtaining a damaged image to be restored, preprocessing the damaged image to be restored, to obtain a mask image and an edge structure image, separately inputting the damaged image to be restored, the mask image, and the edge structure image into the target image inpainting model, and outputting, by the target image inpainting model, a restored image.

Through the description of the foregoing examples, those skilled in the art can clearly understand that the examples can be implemented by means of software plus a necessary universal hardware platform, or certainly, can be implemented through hardware. Based on such understanding, the technical solutions essentially or the part contributing to the prior art may be implemented in a form of a software product. The computer software product may be stored in a computer-readable storage medium such as a read-only memory (ROM)/random access memory (RAM), a magnetic disk, or an optical disk, and includes several instructions for enabling a computer device (which may be a personal computer, a server, a network device, or the like) to execute the method according to each or some of the embodiments.

Finally, it should be noted that the foregoing embodiments are only used to illustrate the technical solutions of the present disclosure, and are not intended to limit the present disclosure. Although the present disclosure is described in detail with reference to the foregoing embodiments, a person of ordinary skill in the art should understand that he/she can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

What is claimed is:

1. An image inpainting method guided by an image structure and texture information, comprising:

constructing an image inpainting model with an interaction ability between the image structure and the texture information, wherein a structure of the image inpainting model comprises a generator and a discriminator, the generator comprises a structure and texture interaction module (STIM), a gated interaction unit (GIU), and a multi-view local reconstruction network (MLRN), the STIM comprises a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\vartheta(M_T^n, M_S^n) = -\gamma lg(1-X)$$

$$\begin{cases} \text{if } (M_T^n, M_S^n) < \mu, & X = \mu \\ \text{else if } (M_T^n, M_S^n) > 1-\mu, & X = 1-\mu \\ \text{else,} & X = (M_T^n, M_S^n) \end{cases} \text{ wherein}$$

$\theta(\square)$ is a mapping function, $(M_T^n, M_S^n)$ is an input eigenvalue, $lg(\cdot)$ is a logarithmic function, $\gamma$ is a learnable superparameter, $\mu$ is a set minimal value, $M_T^n$ is a first mask feature segment, $M_S^n$ is a second mask feature segment, and X is a variable;

wherein the damaged image sample, the mask image sample, and the edge structure image sample are used as an input into the STIM, and the STIM outputs a feature result, specifically comprising:

inputting the mask image sample into the intermediate encoder, and outputting, by the intermediate encoder, the first mask feature segment and the second mask feature segment after a convolution operation, a normalization operation and a Sigmoid activation function operation;

jointly inputting a preprocessed image sample combination into the texture information encoder upper branch, outputting, by the texture information encoder upper branch, a texture feature corresponding to the image sample combination, adding the texture feature to a remapped first mask feature segment in a channel dimension after performing a convolution operation, a normalization operation, and a LeakyReLU activation function operation on the texture feature, and then multiplying a result thereof in the channel dimension with a structure feature output by the structure information encoder lower branch, to obtain a first feature result, wherein the image sample combination comprises the damaged image sample, the mask image sample, and the edge structure image sample; and jointly inputting the preprocessed image sample combination into the structure information encoder lower branch, outputting, by the structure information encoder lower branch, the structure feature corresponding to the image sample combination, adding the structure feature to a remapped second mask feature segment in the channel dimension after performing a convolution operation, a normalization operation, and a LeakyReLU activation function operation on the structure feature, and then multiplying a result thereof in the channel dimension with the texture feature output by the texture information encoder upper branch, to obtain a second feature result;

preprocessing a damaged image sample, to obtain a mask image sample and an edge structure image sample;

inputting the damaged image sample, the mask image sample, and the edge structure image sample into the image inpainting model, training the image inpainting model, and generating weight information of the image inpainting model, to obtain a target image inpainting model; and obtaining a damaged image to be restored, preprocessing the damaged image to be restored, to obtain a mask image and an edge structure image, separately inputting the damaged image to be restored, the mask image, and the edge structure image into the target image inpainting model, and outputting, by the target image inpainting model, a restored image.

2. The image inpainting method guided by an image structure and texture information according to claim 1, wherein a loss function of the discriminator in the image inpainting model comprises a step loss sub-function, a perceptual loss sub-function, a style loss sub-function, and an adversarial loss sub-function; and an expression of the loss function of the image inpainting model is:

$$L_{joint} = \lambda_1 L_{step} + \lambda_2 L_{perc} + \lambda_3 L_{style} + \lambda_4 L_{adv}, \text{ wherein}$$

$L_{joint}$ is the loss function of the image inpainting model, $L_{step}$ is the step loss sub-function, $L_{perc}$ is the perceptual loss sub-function, $L_{style}$ is the style loss sub-function, $L_{adv}$ is the adversarial loss sub-function, and $\lambda_1$, $\lambda_2$, $\lambda_3$, and $\lambda_4$ are respectively a weight of the step loss sub-function, a weight of the perceptual loss sub-function, a weight of the style loss sub-function, and a weight of the adversarial loss sub-function.

3. The image inpainting method guided by an image structure and texture information according to claim 2, wherein an expression of the step loss sub-function is:

$$L_{step} = \sum_{k=1}^{5} \eta_k E\big[\square I_k^{out} - I_k^{gt} \square_1\big],$$

wherein $\eta_k$ is a weighting coefficient, E is an expectation, $I_k^{out}$ is an image output in a $k^{th}$ stage of the MLRN, and $I_k^{gt}$ is an original thumbnail image corresponding to an image size in the $k^{th}$ stage during model training;

an expression of the perceptual loss sub-function is:

$$L_{perc} = E\left[\sum_i \|\phi_i(I_1^{out}) - \phi_i(I_1^{gt})\|_1\right],$$

$\phi_i$ is activation of an $i^{th}$ pooling layer, $I_1^{out}$ is an image output in a first stage of the MLRN, and $I_1^{gt}$ is an original thumbnail image corresponding to an image size in the first stage during model training;

an expression of the style loss sub-function is:

$$L_{style} = E\left[\sum_i \|\psi_i(I_1^{out}) - \psi_i(I_1^{gt})\|_1\right],$$

$\psi_i$ is a style loss based on a Gram matrix, and $\psi_i(\square) = \phi_i(\square)^T \phi_i(\square)$; and an expression of the adversarial loss sub-function is:

$$L_{adv} = \min_G \max_D E_{I_1^{gt}, E_1^{gt}}[\log D(I_1^{gt}, E_1^{gt})] + E_{I_1^{out}, E_1^{out}}\log[1 - D(I_1^{out}, E_1^{out})], \text{ wherein}$$

G is the generator, D is the discriminator, $R_1^{gt}$ and $R_1^{out}$ are respectively an edge structure image corresponding to the original thumbnail image corresponding to the image size in the $k^{th}$ stage and an edge structure image corresponding to the image output in the $k^{th}$ stage of the MLRN during model training.

4. The image inpainting method guided by an image structure and texture information according to claim 1, wherein the GIU comprises a forward connection and a residual connection, and the forward connection comprises a convolution operation, a normalization operation, and a LeakyReLU activation function;

in the residual connection, an input feature is subjected to a strip pooling operation in a feature height direction and a strip pooling operation in a feature width direction, channel expansion is performed through 3×1 convolution, and then features are concatenated in the channel dimension to restore original height and width of the feature input into the GIU; and 3×1 convolution using a Sigmoid activation function is applied to generate an image gated feature, adding the image gated feature to the forward connection in the channel dimension, to generate a final output of the GIU.

5. The image inpainting method guided by an image structure and texture information according to claim 1, wherein the MLRN comprises five steps, sequentially restoring 1/16, 1/8, 1/4, 1/2, and 1/1 of an original image resolution, a feature result of each step has two forward outputs: a pixel-wise restoration output that uses 1×1 mapping convolution to restore an image of a corresponding size, and a feature transfer output that transfers a low-resolution feature to a high-resolution feature to guide high-resolution restoration, ultimately generating an image at the original image resolution.

6. The image inpainting method guided by an image structure and texture information according to claim 1, wherein said preprocessing a damaged image sample, to obtain a mask image sample and an edge structure image sample comprises:

inputting the damaged image sample into a Canny edge detector, and outputting, by the Canny edge detector, the edge structure image sample corresponding to the damaged image sample.

7. An electronic device, comprising at least one processor and a memory in communication connection with the at least one processor, wherein the memory stores an instruction capable of being executed by the at least one processor, and the instruction is executed by the at least one processor, such that the at least one processor executes the method according to claim 1.

8. The electronic device according to claim 7, wherein a loss function of the discriminator in the image inpainting model comprises a step loss sub-function, a perceptual loss sub-function, a style loss sub-function, and an adversarial loss sub-function; and an expression of the loss function of the image inpainting model is:

$$L_{joint} = \lambda_1 L_{step} + \lambda_2 L_{perc} + \lambda_3 L_{style} + \lambda_4 L_{adv}, \text{ wherein}$$

$L_{joint}$ in is the loss function of the image inpainting model, $L_{step}$ is the step loss sub-function, $L_{perc}$ is the perceptual loss sub-function, $L_{style}$ is the style loss sub-function, $L_{adv}$ is the adversarial loss sub-function, and $\lambda_1$, $\lambda_2$, $\lambda_3$, and $\lambda_4$ are respectively a weight of the step loss sub-function, a weight of the perceptual loss sub-function, a weight of the style loss sub-function, and a weight of the adversarial loss sub-function.

9. The electronic device according to claim 8, wherein an expression of the step loss sub-function is:

$$L_{step} = \sum_{k=1}^{5} \eta_k E[\|I_k^{out} - I_k^{gt}\|_1],$$

wherein $\eta_k$ is a weighting coefficient, E is an expectation, $I_k^{out}$ is an image output in a $k^{th}$ stage of the MLRN, and $I_k^{gt}$ is an original thumbnail image corresponding to an image size in the $k^{th}$ stage during model training;

an expression of the perceptual loss sub-function is:

$$L_{perc} = E\left[\sum_i \|\phi_i(I_1^{out}) - \phi_i(I_1^{gt})\|_1\right],$$

wherein $\phi_i$ is activation of an $i^{th}$ pooling layer, $I_1^{out}$ is an image output in a first stage of the MLRN, and $I_1^{gt}$ is an original thumbnail image corresponding to an image size in the first stage during model training;

an expression of the style loss sub-function is:

$$L_{style} = E\left[\sum_i \|\psi_i(I_1^{out}) - \psi_i(I_1^{gt})\|_1\right],$$

$\psi_i$ is a style loss based on a Gram matrix, and $\psi_i(\square) = \phi_i(\square)^T \phi_i(\square)$; and an expression of the adversarial loss sub-function is:

$$L_{adv} = \min_G \max_D E_{I_1^{gt}}, E_{E_1^{gt}}\left[\log D(I_1^{gt}, E_1^{gt})\right] \\ + E_{I_1^{out}}, E_{E_1^{ou}}, \log[1 - D(I_1^{ou}, E_1^{ou})]$$, wherein G is the generator, D is the discriminator, $R_1^{gt}$ and $R_1^{out}$ are respectively an edge structure image corresponding to the original thumbnail image corresponding to the image size in the $k^{th}$ stage and an edge structure image corresponding to the image output in the $k^{th}$ stage of the MLRN during model training.

10. The electronic device according to claim 7, wherein the GIU comprises a forward connection and a residual connection, and the forward connection comprises a convolution operation, a normalization operation, and a LeakyReLU activation function;

in the residual connection, an input feature is subjected to a strip pooling operation in a feature height direction and a strip pooling operation in a feature width direction, channel expansion is performed through 3×1 convolution, and then features are concatenated in the channel dimension to restore original height and width of the feature input into the GIU; and 3×1 convolution using a Sigmoid activation function is applied to generate an image gated feature, adding the image gated feature to the forward connection in the channel dimension, to generate a final output of the GIU.

11. The electronic device according to claim 7, wherein the MLRN comprises five steps, sequentially restoring 1/16, 1/8, 1/4, 1/2, and 1/1 of an original image resolution, a feature result of each step has two forward outputs: a pixel-wise restoration output that uses 1×1 mapping convolution to restore an image of a corresponding size, and a feature transfer output that transfers a low-resolution feature to a high-resolution feature to guide high-resolution restoration, ultimately generating an image at the original image resolution.

12. The electronic device according to claim 7, wherein said preprocessing a damaged image sample, to obtain a mask image sample and an edge structure image sample comprises:

inputting the damaged image sample into a Canny edge detector, and outputting, by the Canny edge detector, the edge structure image sample corresponding to the damaged image sample.

13. An image inpainting system guided by an image structure and texture information, comprising:

a construction module configured to construct an image inpainting model with an interaction ability between the image structure and the texture information, wherein a structure of the image inpainting model comprises a generator and a discriminator, the generator comprises a structure and texture interaction module (STIM), a gated interaction unit (GIU), and a multi-view local reconstruction network (MLRN), the STIM comprises a texture information encoder upper branch, a structure information encoder lower branch, and an intermediate encoder, output results of the texture information encoder upper branch and the structure information encoder lower branch each have a remapping relationship with an output result of the intermediate encoder, and an expression of remapping is as follows:

$$\vartheta(M_T^n, M_S^n) = -\gamma \lg(1 - X)$$

$$\begin{cases} \text{if } (M_T^n, M_S^n) < \mu & , X = \mu \\ \text{else if } (M_T^n, M_S^n) > 1 - \mu & , X = 1 - \mu \\ \text{else} & , X = (M_T^n, M_S^n) \end{cases}$$ wherein $\theta(\square)$ is a mapping function, $(M_T^n, M_S^n)$ is an input eigenvalue, $\lg(\cdot)$ is a logarithmic function, $\gamma$ is a learnable superparameter, $\mu$ is a set minimal value, $M_T^n$ is a first mask feature segment, $M_S^n$ is a second mask feature segment, and X is a variable;

wherein the damaged image sample, the mask image sample, and the edge structure image sample are used as an input into the STIM, and the STIM outputs a feature result, specifically comprising:

inputting the mask image sample into the intermediate encoder, and outputting, by the intermediate encoder, the first mask feature segment and the second mask feature segment after a convolution operation, a normalization operation and a Sigmoid activation function operation;

jointly inputting a preprocessed image sample combination into the texture information encoder upper branch, outputting, by the texture information encoder upper branch, a texture feature corresponding to the image sample combination, adding the texture feature to a remapped first mask feature segment in a channel dimension after performing a convolution operation, a normalization operation, and a LeakyReLU activation function operation on the texture feature, and then multiplying a result thereof in the channel dimension with a structure feature output by the structure information encoder lower branch, to obtain a first feature result, wherein the image sample combination comprises the damaged image sample, the mask image sample, and the edge structure image sample; and jointly inputting the preprocessed image sample combination into the structure information encoder lower branch, outputting, by the structure information encoder lower branch, the structure feature corresponding to the image sample combination, adding the structure feature to a remapped second mask feature segment in the channel dimension after performing a convolution operation, a normalization operation, and a LeakyReLU activation function operation on the structure feature, and then multiplying a result thereof in the channel dimension with the texture feature output by the texture information encoder upper branch, to obtain a second feature result;

a preprocessing module configured to preprocess a damaged image sample, to obtain a mask image sample and an edge structure image sample;

a training module configured to input the damaged image sample, the mask image sample, and the edge structure image sample into the image inpainting model, train the image inpainting model, and generate weight information of the image inpainting model, to obtain a target image inpainting model; and an output module configured to obtain a damaged image to be restored, preprocess the damaged image to be restored, to obtain a mask image and an edge structure image, and separately input the damaged image to be restored, the mask image, and the edge structure image into the target image inpainting model, wherein the target image inpainting model outputs a restored image.

* * * * *